US009736139B2

(12) United States Patent
Melton et al.

(10) Patent No.: US 9,736,139 B2
(45) Date of Patent: Aug. 15, 2017

(54) STORAGE OF CAPTURED SENSITIVE DATA WITH BYPASS OF LOCAL STORAGE

(71) Applicant: Microsoft Technology Licensing, LLC, Redmond, WA (US)

(72) Inventors: B. James Melton, Redmond, WA (US); Andrew Byrne, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/825,569

(22) Filed: Aug. 13, 2015

(65) Prior Publication Data

US 2017/0048221 A1 Feb. 16, 2017

(51) Int. Cl.
*H04L 29/06* (2006.01)
*G06F 21/62* (2013.01)

(52) U.S. Cl.
CPC .......... *H04L 63/08* (2013.01); *G06F 21/6218* (2013.01); *G06F 21/6245* (2013.01); *H04L 63/102* (2013.01)

(58) Field of Classification Search
CPC .................................................. H04L 63/102
See application file for complete search history.

(56) References Cited

U.S. PATENT DOCUMENTS

| | | | |
|---|---|---|---|
| 7,770,116 B2 | 8/2010 | Zhang et al. | |
| 8,370,433 B2 * | 2/2013 | Conner | G06Q 10/10 709/204 |
| 8,553,965 B2 | 10/2013 | Zhao et al. | |
| 9,071,967 B1 * | 6/2015 | Davies | H04W 12/06 |
| 9,209,975 B2 * | 12/2015 | Uchida | G06F 21/6227 |
| 9,591,140 B1 * | 3/2017 | Carlson | H04M 3/56 |
| 2004/0111415 A1 | 6/2004 | Scardino et al. | |
| 2006/0085844 A1 * | 4/2006 | Buer | H04L 63/068 726/4 |
| 2008/0074559 A1 * | 3/2008 | Choi | H04H 60/16 348/739 |
| 2009/0316047 A1 * | 12/2009 | Sawada | H04N 5/57 348/569 |

(Continued)

OTHER PUBLICATIONS

"The Photo App that Lets You Snap, Organize and Store Forever", Retrieved on: May 6, 2015, Available at: http://trunx.me/.

(Continued)

*Primary Examiner* — Ali Shayanfar
(74) *Attorney, Agent, or Firm* — International IP Law Group, PLLC

(57) ABSTRACT

The claimed subject matter includes techniques for storing sensitive data. An example system includes a processor and a computer-readable memory storage device storing executable instructions that can be executed by the processor to cause the processor to send authentication credentials to a service to request authorization to store sensitive data with the service. The example system also includes instructions that can be executed by the processor to cause the processor to capture sensitive data from a sensor on a device. The example system also includes instructions that can be executed by the processor to cause the processor to bypass storing the captured sensitive data in any non-volatile memory in the device and stream the captured sensitive data to the service from the sensor.

15 Claims, 5 Drawing Sheets

(56) References Cited

U.S. PATENT DOCUMENTS

| | | | | | |
|---|---|---|---|---|---|
| 2010/0118158 | A1* | 5/2010 | Boland | ............ | H04N 5/23203 348/211.2 |
| 2011/0320044 | A1* | 12/2011 | Smith | ............... | G06F 3/04847 700/276 |
| 2012/0063736 | A1* | 3/2012 | Simmons | ........... | H04N 21/4788 386/224 |
| 2013/0191891 | A1* | 7/2013 | Adderly | ............... | H04W 12/06 726/5 |
| 2014/0006347 | A1* | 1/2014 | Qureshi | ................. | G06F 21/10 707/621 |
| 2014/0109210 | A1* | 4/2014 | Borzycki | ............. | A63F 13/213 726/7 |
| 2014/0142984 | A1* | 5/2014 | Wright | ................. | G06F 19/321 705/3 |
| 2014/0168344 | A1* | 6/2014 | Shoemake | ............ | H04N 7/147 348/14.01 |
| 2014/0173692 | A1 | 6/2014 | Srinivasan et al. | | |
| 2014/0280595 | A1* | 9/2014 | Mani | ................... | H04L 12/1827 709/204 |
| 2014/0327728 | A1* | 11/2014 | Modai | ..................... | H04N 7/15 348/14.08 |
| 2015/0373010 | A1* | 12/2015 | Zhang | .................. | H04L 63/083 726/7 |
| 2016/0242043 | A1* | 8/2016 | Dong | .................... | H04W 4/005 |

OTHER PUBLICATIONS

Guay, Matthew, "Cloud Storage Without Using up Local Storage with the New ExpanDrive 3", Published on: May 17, 2013, Available at: http://mac.appstorm.net/reviews/synchronization/cloud-storage-without-using-up-local-storage-with-the-new-expandrive-3/.

"SkyDesk PhotoNote App Digitizes Analog Information", Published on: May 16, 2013, Available at: http://news.fujixerox.com/news/2013/000892/.

Catherinec, "How do I Upload Media to My Pogoplug Account from My iPhone or iPad?", Published on: Jan. 16, 2014, Available at: http://support.pogoplug.com/hc/en-us/articles/202307960-How-do-l-upload-media-to-my-Pogoplug-account-from-my-iPhone-or-iPad-.

Janwillem, "Auto Upload Camera Roll to OneDrive for Business", Published on: Dec. 17, 2014, Available at: http://community.office365.com/en-us/f/154/t/283912.aspx.

Barrus, et al., "The CloudBoard Research Platform: An Interactive Whiteboard for Corporate Users", In Proceedings of International Society for Optics and Photonics, Mar. 2013, 14 pages.

"Liberate your Medical Images", Published on: Apr. 6, 2015, Available at: https://www.image32.com/.

"Office Lens: A OneNote Scanner for Your Pocket", Published on: Mar. 17, 2014, Available at: http://blogs.office.com/2014/03/17/office-lens-a-onenote-scanner-for-your-pocket/.

Soferman, Nadav, "Cloudinary Blog—Direct Upload Made Easy, from Browser or Mobile App to the Cloud", Published on: Jul. 16, 2014, Available at: http://cloudinary.com/blog/direct_upload_made_easy_from_browser_or_mobile_app_to_the_cloud.

Newton, et al., "iCloud Photo Stream", Published on: Aug. 29, 2013, Available at: http://www.theverge.com/2013/8/29/4560364/best-cloud-storage-photo-apps.

"Shutter—The Infinite Camera by Streamnation", Retrieved on: May 6, 2015, Available at: https://www.streamnation.com/shutter.

Klosowski, Thorin, "Store Your Photos in the Google+ Cloud Automatically", Published on: Jul. 5, 2012, Available at: http://lifehacker.com/5923588/the-best-google-features-youre-probably-not-using.

* cited by examiner

STORAGE OF CAPTURED SENSITIVE DATA WITH BYPASS OF LOCAL STORAGE

BACKGROUND

Mobile devices can be used to capture sensitive data such as photos, audio, or videos during events or meetings. Generally, a mobile device saves captured data to a local storage on the device. In some examples, the mobile device can later transmit copies of the local captured data to external storage devices.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

An implementation provides a system for storing sensitive data. The system includes a processor and a computer-readable memory storage device storing executable instructions that can be executed by the processor to cause the processor to send authentication credentials to a service to request authorization to store sensitive data with the service. The instructions can also cause the processor to capture the sensitive data from a sensor on a device. The instructions can further cause the processor to bypass storing the captured sensitive data in any non-volatile memory in the device and stream the captured sensitive data to the service from the sensor.

Another implementation provides method for storing sensitive data. The method can include sending, via a processor, authentication credentials to a server to request authorization to store sensitive data with a service. The method can also include capturing, via the processor, the sensitive data from a sensor on a device. The method can further include bypassing, via the processor, storing the captured sensitive data in any non-volatile memory in the device. The method can also further include streaming, via the processor, the captured sensitive data to the service from the sensor. The method can also include sending, via the processor, event information in a file header for grouping the captured sensitive data based on the event information.

Another implementation provides one or more computer-readable storage medium for storing computer readable instructions that, when executed by one or more processing devices, instruct the storage of sensitive data. The computer-readable medium includes instructions to receive an identifier comprising permissions granted to an application registration and request authorization to store sensitive data with a service based on authentication credentials. The computer-readable medium also includes instructions to capture the sensitive data from a sensor on a device. The computer-readable medium includes instructions to bypass storing the captured sensitive data in any non-volatile memory device in the device. Further, the computer-readable medium includes instructions to stream the captured sensitive data to the service from the sensor. The computer-readable medium also further includes instructions to send event information to the service in a file header for grouping the captured sensitive data based on the event information.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Mobile devices are frequently used to capture or store sensitive data during meetings or events. Sensitive data, as used herein, refers to images, video, audio, or text, and the like that are confidential and accessible by an authorized group of users. For example, a photo can be captured of a white board containing sensitive data during a private meeting and shared with authorized individuals. Such sensitive data may currently be stored locally in the device used to capture the data. For example, a smart phone may save a captured photo to a camera roll folder that is stored locally on the device. However, storing such sensitive information on personal devices may be against company policy and may result in unintended sharing of the sensitive data. For example, a compromised personal device may result in leaks of sensitive data to unauthorized individuals. Moreover, such sensitive data may also be uploaded to a personal storage server that may also be compromised due to lower security policies.

This disclosure describes techniques to store sensitive data on a secure server without generating any local copies of the sensitive data on the device used to capture the sensitive data. In some examples, the sensitive data can be grouped together with other sensitive data recorded by the same or other devices during a particular event or meeting.

In some example, the sensitive data can include a file header with event information. A file header, as used herein, refers to supplemental data placed at the beginning of a block of data being transmitted. Event information, as used herein, includes meeting information such as time, date, place, and attendees.

The techniques thus enable sensitive data to be captured, stored, and shared without leaving accessible local copies of the sensitive data on the personal devices used to capture or view the data. For example, a personal device such as a smart phone can capture the sensitive data and have the data bypass any non-volatile memory in the smart phone and uploaded to a secure server. Thus, the techniques provide for increased security in the handling of sensitive data by providing storage that is separated from personal data. Furthermore, since the sensitive data is not stored locally on the personal device, the techniques result in reduced use of limited local storage resources on personal devices. Moreover, by compressing the sensitive data, network and server storage resources are saved. These techniques are described in more detail below.

Figure 1:
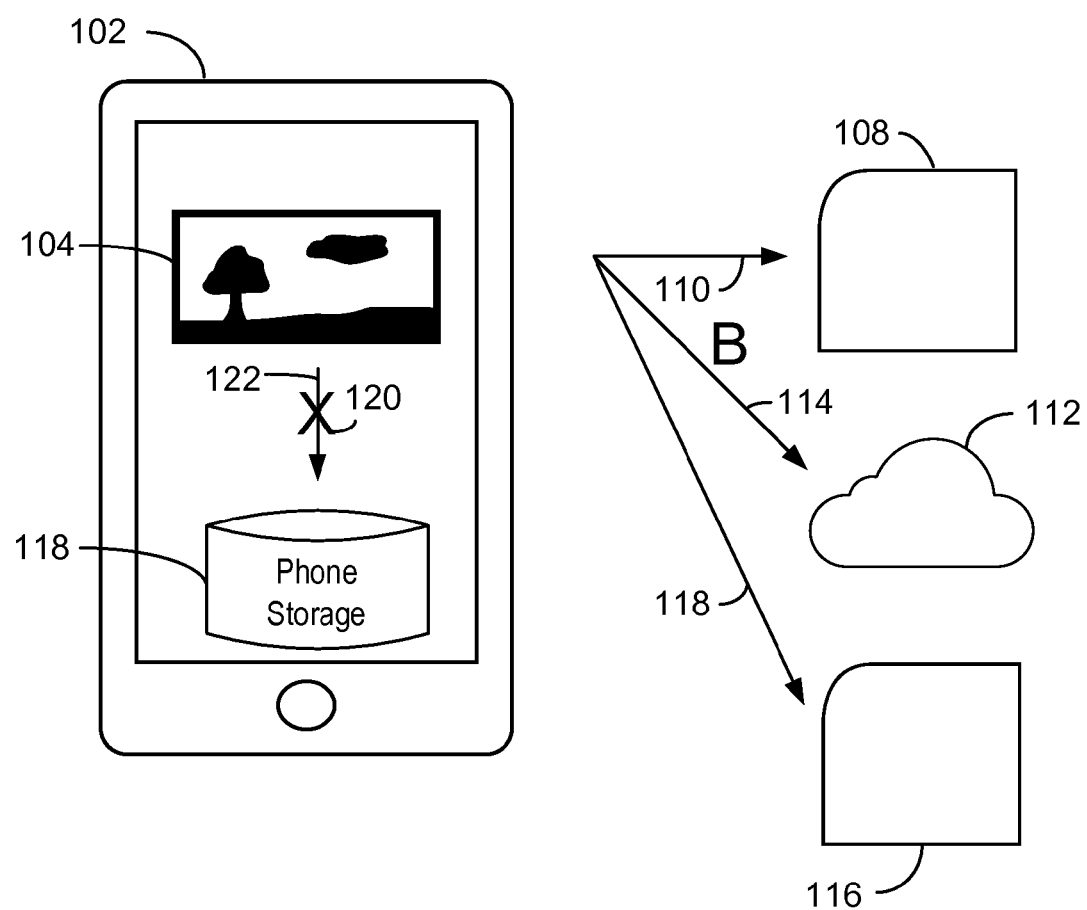
FIG. 1 is a block diagram of an example system for implementing various aspects of the techniques described herein.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein, is intended to encompass a computer program accessible from any computer-readable storage device or media. Computer-readable storage media include magnetic storage devices, e.g., hard disk, floppy disk, magnetic strips, optical disk, compact disk (CD), digital versatile disk (DVD), smart cards, flash memory devices, among others. Moreover, computer-readable storage media does not include communication media such as transmission media for wireless signals. In contrast, computer-readable media, i.e., not storage media, may include communication media such as transmission media for wireless signals.

FIG. 1 is a block diagram of an example system for implementing various aspects of the techniques described herein. The example system of FIG. 1 is referred to generally by the reference number 100.

In the example system 100, a mobile device 102 is shown sending a captured picture 104 to an email server 108 via a connection 110. The mobile device 102 is also shown sending the captured picture 104 to cloud storage 112 via a network connection 114. The mobile device 102 is also depicted sending the captured picture 104 to an application service 116 via a network connection 118. For example, the application service can be a cloud-hosted application. In some examples, the application service can thus be located on one or more servers. In addition, the mobile device 102 is shown avoiding storage of the captured picture 104 to local phone storage 118 as indicated by an X 120 over a connection 122.

In the example system 100, the mobile device 102 may have a secure storage application that allows sensitive data such as photos to be stored securely and remotely. For example, a user may be at a private meeting and want to take some pictures of a whiteboard during a presentation. The application may receive account information from the user and use the information for authentication with one or more servers corresponding to email server 108, cloud server 112, and/or application service 116. In some examples, authentication can take place through an initial dialog during a first execution of the application. In other examples, the authentication can be performed as the first sensitive data is captured by the application.

Once authentication and authorization has been performed and/or during authentication and/or authorization, the application may receive information from one or more sensors and display this information in a live preview. For example, a picture can be displayed in a camera preview screen as shown in FIG. 1. In some embodiments, the picture can be displayed in any suitable orientation such as a vertical or horizontal orientation. In some examples, audio and video may also be previewed by sending a live audio or video stream to a headphone jack and/or display.

In some embodiments, the mobile device 102 can detect user input or a user gesture indicating that sensitive data, such as an image or sensitive data being previewed in the "viewfinder" is to be captured. For example, the user may touch one or more on-screen buttons on the mobile device 102 or push a hardware shutter on the mobile device 102 to perform a capture of the sensitive data. In some examples, a shutter sound may be heard when capturing a photo. If video or audio is being captured, a second touch by a user may be received by the mobile device 102 and capture subsequently stopped. In some examples, a user can press and hold on the screen of the mobile device 102 to record video or audio and the audio or video capture stopped upon release. In any case, an application stored in the mobile device 102 can then stream the captured sensitive data to a service. In some examples, text may be captured. For example, a data entry field may displayed on a mobile device screen. The text received in response to the displayed data entry field may be streamed to the service. In some examples, after the sensitive data is streamed to the service, a local toast notification can also be displayed on the mobile device upon completion. The toast notification can be a transient message indicating time-sensitive information. In some examples, an audio tone may indicate a completed upload to the service.

As shown in FIG. 1, the sensitive data can be uploaded to one or more services on one or more servers 108, 112, 116. For example, the sensitive data may be uploaded to an email server 108 via a Simple Mail Transfer Protocol (SMTP) connection 110. In some examples, Simple Mail Transfer Protocol Secure (SMTPS) may be used to add a layer of transport layer security to the connection 110. For example, the connection 110 may be secured using Secure Sockets Layer (SSL), Transport Layer Security (TLS), and the like. The sensitive data may also likewise be uploaded to a cloud server 112 via a connection 114 using Hypertext Transfer Protocol HTTP over SSL, or HTTP over TLS, also referred to generally as HTTPS, SSH (Secure Shell) File Transfer Protocol (SFTP), FTP over SSL, Applicability Statement 2 (AS2), and the like. The sensitive data may be stored on one or more secure storage devices on one or more cloud servers 112. In addition, the sensitive data may be uploaded to an application service 116. For example, the application service 116 may be hosted on a secure server providing additional services for the mobile application. In any case, as also shown in FIG. 1, a local copy of the sensitive data 104 is not stored in local mobile device storage 118. Thus, the present techniques can also address a limited capacity on mobile device storage 118.

The diagram of FIG. 1 is not intended to indicate that the example system 100 is to include all of the components shown in FIG. 1. Rather, the example system 100 can include fewer or additional components not illustrated in FIG. 1 (e.g., additional mobile devices, servers, etc.).

Figure 2:
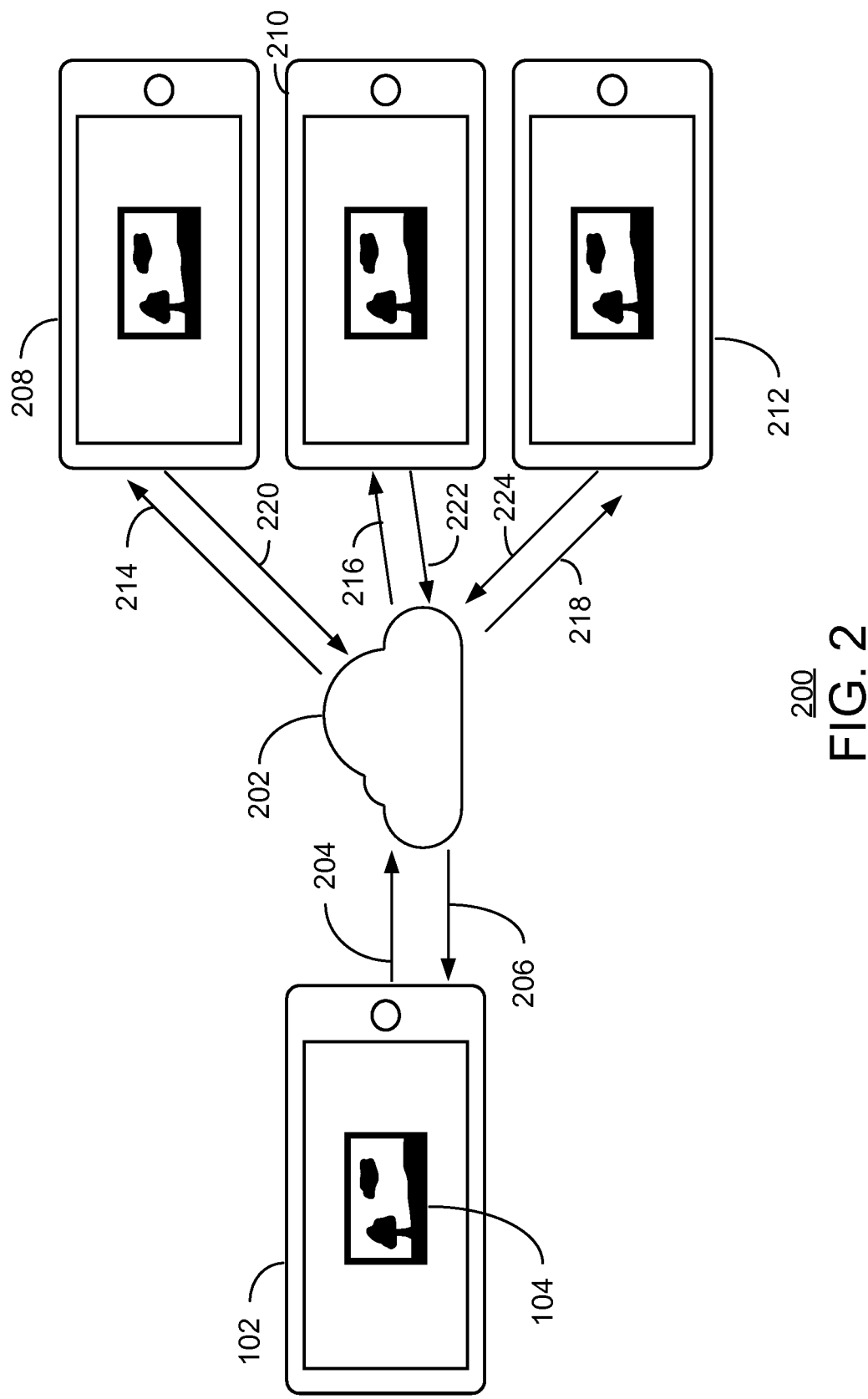
FIG. 2 is a block diagram of an example system for storing sensitive data.

FIG. 2 is a block diagram of an example system for storing sensitive data. The example system 200 can be implemented using the mobile computing device 102.

The example system 200 includes a mobile device 102 that is shown sending 204 and receiving 206 sensitive data such as a photo 104 to and from a cloud server 202. In FIG. 2, additional mobile devices 208, 210, 212 are shown receiving sensitive data via secure connections 214, 216, and 218, respectively. The additional mobile devices 208, 210, 212 are also shown sending sensitive data via secure connections 220, 222, and 224, respectively.

In the example system 200 of FIG. 2, a mobile device 102 used to capture sensitive data such as a photo 104 may send and receive the photo 104 from a cloud server as indicated by arrows 204 and 206. For example, the photo 104 may have been taken during a private meeting with a plurality of participants. In some examples, the mobile devices 208, 210, 212 may belong to a plurality of authorized users. For example, the users may have also been attending the private meeting or event and may be employees or members of the same organization. In any case, the authorized users may have authentication credentials giving them access to the secure cloud server 202. Thus, with the secure storage application installed, the mobile devices 208, 210, 212 can also capture sensitive data and store and/or retrieve the data from the cloud server 202. In some examples, the sensitive data can also be grouped together and stored in the same location. For example, sensitive pictures taken during a meeting by different mobile devices may be grouped together and stored on the same cloud server 202 as discussed in greater detail with respect to FIG. 3 below.

Thus, the present techniques save resources such as storage that may have otherwise been spent on storing sensitive data locally. Furthermore, the techniques reduce the risk of compromised sensitive data by storing the sensitive data on a secure server.

The diagram of FIG. 2 is not intended to indicate that the example system 200 is to include all of the components shown in FIG. 2. Rather, the example system 200 can include fewer or additional components not illustrated in FIG. 2 (e.g., additional mobile devices, servers, etc.).

Figure 3:
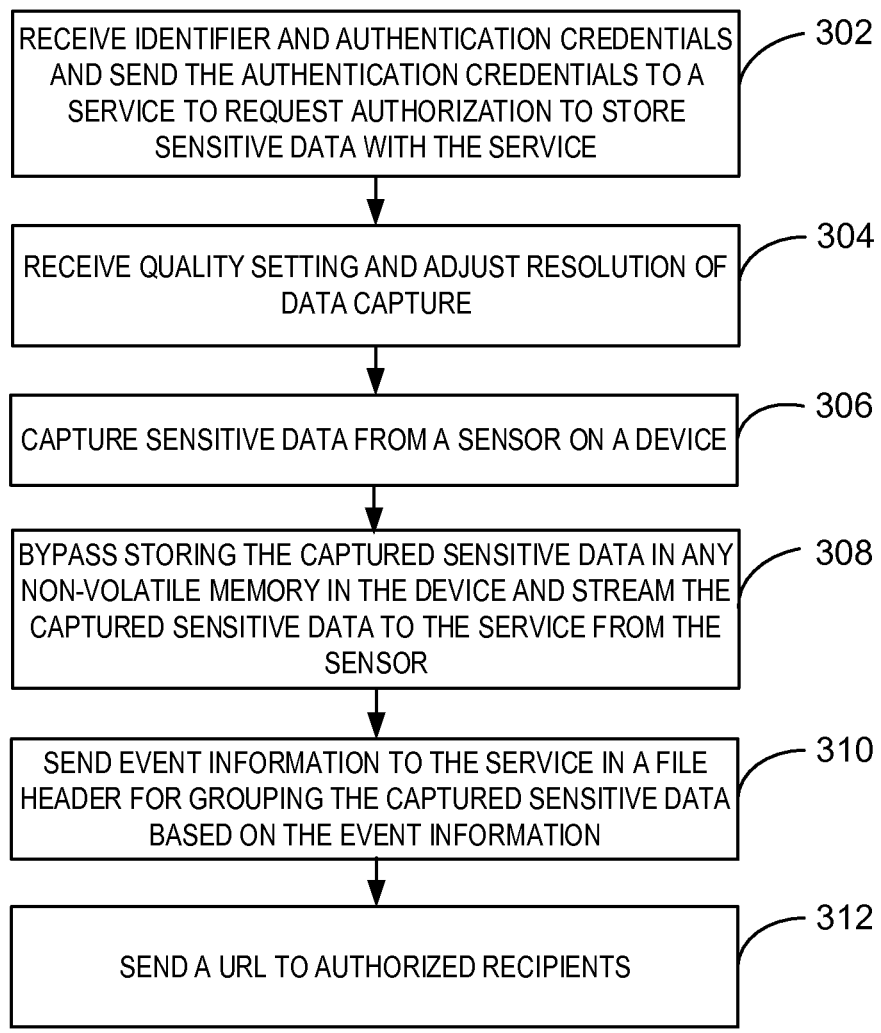
FIG. 3 shows a process flow diagram of an example method for storing sensitive data.

FIG. 3 shows a process flow diagram of an example method for storing sensitive data. The method is generally referred to by the reference number 300 and can be implemented using the mobile device 102 of FIG. 1 or computer 402 of FIG. 4 described below.

At block 302, a credential module receives an identifier and authentication credentials and sends the authentication credentials to a server to request authorization to store sensitive data with a service. The identifier can be granted to an application upon completion of an app registration process. The identifier can uniquely identify the app with the server. This unique identifier links the app to a set of permissions that this application intends to exercise through the course of usage, execution, etc. In some examples, the application registration may be with a cloud application service or some other third party with which the capture device authenticates. The authentication credentials can be any suitable authentication data, such as a username and password combination, a token, and the like, which can be used to establish a connection with the service. For example, the service may be running on one or more secure servers. For example, a mobile device may receive authentication credentials from a user. In some embodiments, the server can be a cloud server, an email server, or an application service server, among others. The authentication credentials may be provided to the app during the application's login process. The user may then provide the authentication credentials to the credential module for use in requesting authorization to store sensitive data with a secure server. For example, the authentication credentials may be a username and a password. In some examples, after authenticating with the service, the capture device can request authorization to store sensitive information within the third party application. In some examples, if the authorization request is granted, the third party application can grant an access token to the capture device. The access token may be used to sign subsequent requests thus establishing the role, rights, and permissions of the app.

At block 304, a quality module receives a quality setting and adjusts a resolution of data capture. For example, a quality setting can include a photo resolution or size, a video resolution or bit rate, and an audio bit rate. In some examples, the quality module can adjust the resolution of captured photos, or the bit rate of captured video and/or audio. In some examples, the quality module can compress files after they are captured into a smaller file size.

At block 306, a capture module captures sensitive data from a sensor on a device. For example, the sensitive data can be a photo, video, or an audio. In some examples, the sensitive data can include text received in response to displaying a data entry field. The capture module can capture the sensitive data in response to receiving an input such as a touch on a touch screen. In some examples, the capture can last as long as the screen is being touched in the case of audio and video capture. In some examples, a second touch can indicate the end of a capture for audio and video.

At block 308, a streaming module bypasses storing the captured sensitive data in any non-volatile memory device in the device and streams the captured sensitive data to the service from the sensor. For example, once a picture is captured, the picture can be uploaded to the one or more secure servers corresponding to the service with which the mobile device has authenticated. In some examples, if audio or video is being captured, the audio or video can be uploaded to the secure server concurrently with the capture. For example, the first portion of the audio or video can be streamed to the server while the rest of the audio or video is being captured.

At block 310, a grouping module sends event information to the service in a file header for grouping the captured sensitive data based on the event information. For example, the event information can be based on calendar information on the mobile device. In some examples, if a mobile device detects that a user is currently in a meeting, then sensitive information can have event information included in the file header of the sensitive data stream. In some examples, the sensitive data can be grouped with additional sensitive data captured during an event during which the stored sensitive data was captured. In some examples, a meeting may not have been scheduled and therefore no calendar information may exist on the mobile device. In this case, the grouping module may display data entry fields on a screen for a user to enter information. The grouping module may receive information or data related to the captured sensitive data from the user and group the captured sensitive data based on the received information or data.

At block 312, a sharing module sends a uniform resource locator (URL) to authorized recipients. For example, the authorized recipients can be one or more participants of an event. In some example, the URL can include a description of the event or meeting such as the date or time and place. In some examples, the URL can be sent to other participants of a meeting. For example, the application can determine the participants from a calendar event on the mobile device. In some examples, the sharing module can send the URL to the authorized recipients via email. In some examples, the sharing module can send the captured sensitive data to the authorized recipients as an encrypted email attachment. In some examples, the streaming module can retrieve sensitive data from the server based on the URL. For example, the sensitive data can be streamed from the server to the mobile device.

This process flow diagram is not intended to indicate that the blocks of the method 300 are to be executed in any particular order, or that all of the blocks are to be included in every case. For example, the quality module may compress files after they are captured at block 306 and before they are streamed at block 308. Further, any number of additional blocks not shown may be included within the method 300, depending on the details of the specific implementation.

Figure 4:
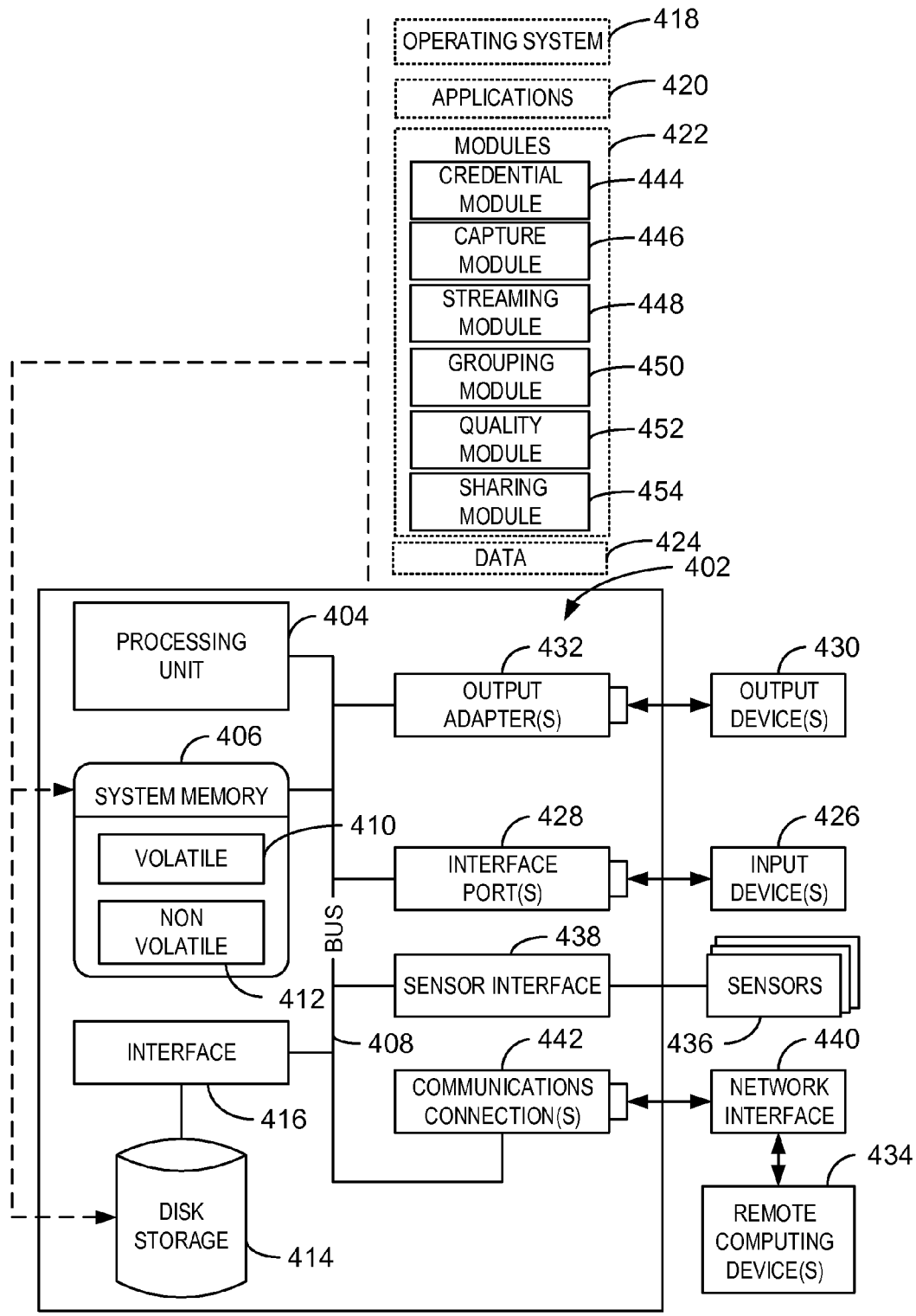
FIG. 4 is a block diagram of an example operating environment configured for implementing various aspects of the techniques described herein.

FIG. 4 is intended to provide a brief, general description of a computing environment in which the various techniques described herein may be implemented. For example, a method and system for storing sensitive data described in FIGS. 1-3 can be implemented in such a computing environment. While the claimed subject matter is described below in the general context of computer-executable instructions of a computer program that runs on a local computer or remote computer, the claimed subject matter also may be implemented in combination with other program modules. Generally, program modules include routines, programs, components, data structures, or the like that perform particular tasks or implement particular abstract data types.

FIG. 4 is a block diagram of an example operating environment configured for implementing various aspects of the techniques described herein. The example operating environment 400 includes a mobile computing device 402. The mobile computing device 402 includes a processing unit 404, a system memory 406, and a system bus 408.

The system bus 408 couples system components including, but not limited to, the system memory 406 to the processing unit 404. The processing unit 404 can be any of various available processors. Dual microprocessors and other multiprocessor architectures also can be employed as the processing unit 404.

The system bus 408 can be any of several types of bus structure, including the memory bus or memory controller, a peripheral bus or external bus, and a local bus using any variety of available bus architectures known to those of ordinary skill in the art. The system memory 406 includes computer-readable storage media that includes volatile memory 410 and nonvolatile memory 412.

The basic input/output system (BIOS), containing the basic routines to transfer information between elements within the mobile computing device 402, such as during start-up, is stored in nonvolatile memory 412. By way of illustration, and not limitation, nonvolatile memory 412 can include read-only memory (ROM), programmable ROM (PROM), electrically programmable ROM (EPROM), electrically erasable programmable ROM (EEPROM), or flash memory.

Volatile memory 410 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The mobile computing device 402 also includes other computer-readable media, such as removable/non-removable, volatile/non-volatile computer storage media. FIG. 4 shows, for example a disk storage 414. Disk storage 414 includes, but is not limited to, devices like a magnetic disk drive, floppy disk drive, tape drive, Jaz drive, Zip drive, LS-210 drive, flash memory card, or memory stick.

In addition, disk storage 414 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 414 to the system bus 408, a removable or non-removable interface is typically used such as interface 416.

It is to be appreciated that FIG. 4 describes software that acts as an intermediary between users and the basic computer resources described in the suitable operating environment 400. Such software includes an operating system 418. Operating system 418, which can be stored on disk storage 414, acts to control and allocate resources of the mobile computing device 402.

System applications 420 take advantage of the management of resources by operating system 418 through program modules 422 and program data 424 stored either in system memory 406 or on disk storage 414. It is to be appreciated that the claimed subject matter can be implemented with various operating systems or combinations of operating systems.

A user enters commands or information into the mobile computing device 402 through input devices 426. Input devices 426 include, but are not limited to, a touch screen, pointing device, such as, a mouse, trackball, stylus, and the like, a keyboard, a microphone, a joystick, a satellite dish, a scanner, a TV tuner card, a digital camera, a digital video camera, a web camera, and the like. The input devices 426 connect to the processing unit 404 through the system bus 408 via interface ports 428. Interface ports 428 include, for example, a serial port, a parallel port, a game port, and a universal serial bus (USB).

Output devices 430 use some of the same type of ports as input devices 426. Thus, for example, a USB port may be used to provide input to the mobile computing device 402 and to output information from mobile computing device 402 to an output device 430.

Output adapter 432 is provided to illustrate that there are some output devices 430 like monitors, speakers, and printers, among other output devices 430, which are accessible via adapters. The output adapters 432 include, by way of illustration and not limitation, video and sound cards that provide a means of connection between the output device 430 and the system bus 408. It can be noted that other devices and systems of devices provide both input and output capabilities such as remote computers 434.

The mobile computing device 402 can be a server hosting various software applications in a networked environment using logical connections to one or more remote computers, such as remote computers 434. The remote computers 434 may be client systems configured with web browsers, PC applications, mobile phone applications, and the like. The remote computers 434 can be a personal computer, a server, a router, a network PC, a workstation, a microprocessor based appliance, a mobile phone, a peer device or other common network node and the like, and typically includes many or all of the elements described relative to the mobile computing device 402.

Remote computers 434 can be logically connected to the mobile computing device 402 through a network interface 436 and then connected via a communication connection 438, which may be wireless. Network interface 436 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 438 refers to the hardware/software employed to connect the network interface 436 to the bus 408. While communication connection 438 is shown for illustrative clarity inside mobile computing device 402, it can also be external to the mobile computing device 402. The hardware/software for connection to the network interface 436 may include, for exemplary purposes, internal and external technologies such as, mobile phone switches, modems including regular telephone grade modems, cable modems and DSL modems, ISDN adapters, and Ethernet cards.

An example processing unit 404 for the server may be a computing cluster. Additionally, the disk storage 414 can store various types of data 424 used to capture sensitive data. For example, the disk storage 414 may comprise an enterprise data storage system, for example, storing data 424 such as quality settings and event information. A quality setting, as used herein, refers to a resolution of capture for the sensor. For example, an image sensor may capture pictures or video at various image resolutions. An audio sensor may also capture audio at various bit rates that can also be specified in the quality settings.

The mobile computing device 402 includes one or more modules 422 configured to perform secure capture of sensitive data, including a credential module 444, a capture module 446, a streaming module 448, a grouping module 450, a quality module 452, and a sharing module 454. The credential module 444 can send credentials to a service. For example, the the credential module can receive an identifier. The identifier can indicate permissions granted to an application. The server can be a secure server, such as an email server, cloud server, or application service server discussed in FIG. 1 above. In some examples, the server may be one of a plurality of storage servers and the credential module can send authentication credentials to any number of services on the plurality of storage servers and request authorization to store sensitive data with the services on the storage servers. For example, the authentication credentials can include authentication information such as a username and password. The capture module 446 can capture sensitive data from a sensor. For example, the sensor can include digital camera sensors, audio sensors, input devices, and the like. The captured sensitive data can include an image, an audio stream, or a video. In some examples, the sensitive data can include text. For example, the text may be received from an input device such as a keyboard in response to displaying a data entry field. The streaming module 448 can then bypass storing the captured sensitive data in any non-volatile memory in the device and stream the captured sensitive data to the service from the sensor. For example, the mobile application can request a bit stream from the streaming module. The bit stream can then be serialized into the body of an HTTP request. At this point, the appropriate headers, such as authorization token can be added to the request, which is then transmitted over a secure channel to the consuming backend as described in detail with respect to FIG. 1 above. For example, the secure channel can be a SSL or TLS channel using HTTPS.

In some examples, the grouping module 450 can attach grouping information to the streamed sensitive data. The grouping module 450 can group the streamed sensitive data based on the grouping information. For example, the grouping information can include a meeting date, time, or place. In some examples, the quality module 452 can modify the captured sensitive data to reduce the size of the capture sensitive data. For example, the quality module 452 can adjust a resolution of capture or compress captured sensitive data. In some examples, the sharing module 454 can send a URL to one or more authorized recipients. For example, the sharing module 454 can send the URL via email. In some examples, the sharing module can also send the sensitive data as an encrypted email attachment.

It is to be understood that the block diagram of FIG. 4 is not intended to indicate that the computing system 400 is to include all of the components shown in FIG. 4. Rather, the computing system 400 can include fewer or additional components not illustrated in FIG. 4 (e.g., additional applications, additional modules, additional memory devices, additional network interfaces, sensors, etc.). Furthermore, any of the functionalities of the credential module 444, the capture module 446, the streaming module 448, the grouping module 450, the quality module 452, and the sharing module 454, can be partially, or entirely, implemented in hardware and/or in a processor. For example, the functionality can be implemented with an application specific integrated circuit, in logic implemented in the processor, or in any other device. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs), etc.

Figure 5:
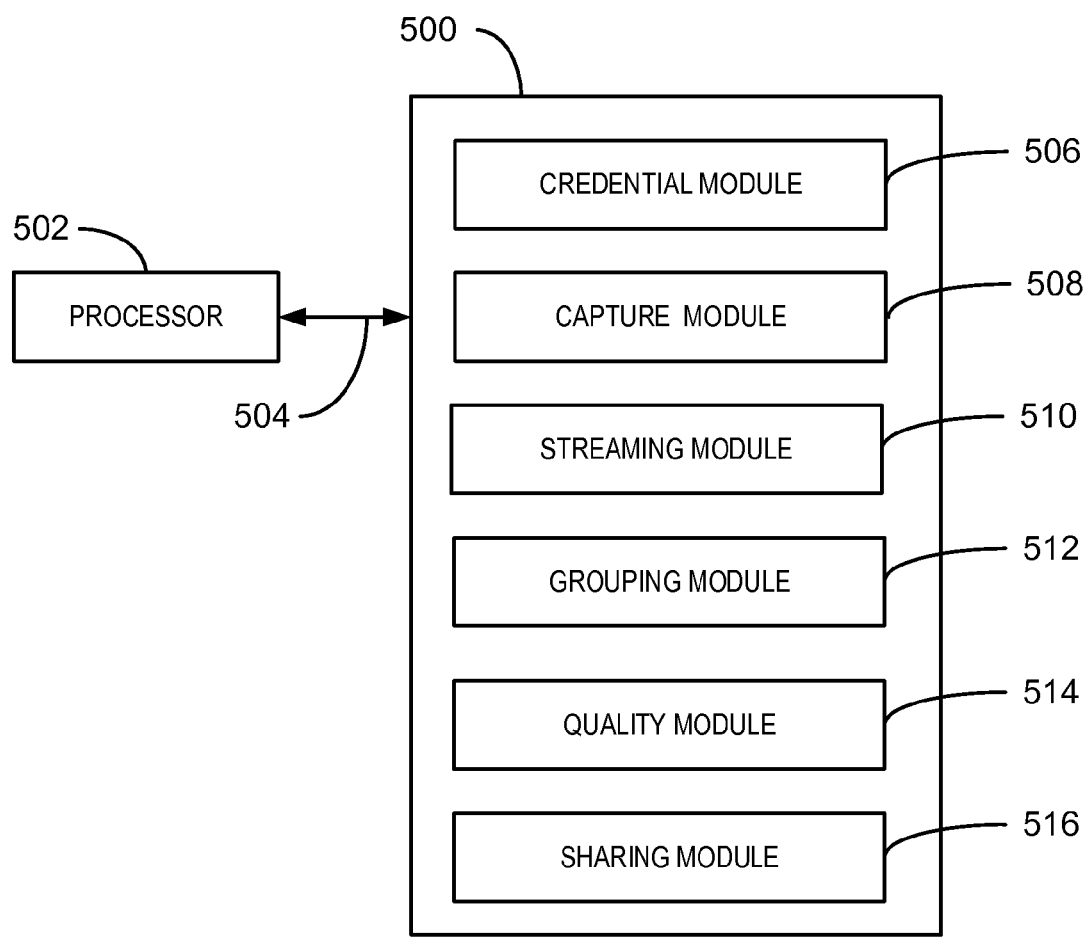
FIG. 5 is a block diagram of an example computer-readable storage medium that can be used to capture and store sensitive data.

FIG. 5 is a block diagram showing an example tangible, computer-readable storage medium that can be used to capture and store sensitive data. The tangible, computer-readable storage media 500 can be accessed by a processor 502 over a computer bus 504. Furthermore, the tangible, computer-readable storage media 500 can include code to direct the processor 502 to perform the current methods. For example, method 300 can be performed by the processor 502.

The various software components discussed herein can be stored on the tangible, computer-readable storage media 500, as indicated in FIG. 5. For example, the tangible computer-readable storage media 500 can include a credential module 506, a capture module 508, a streaming module 510, a grouping module 512, a compression module 514, and a sharing module 516. In some implementations, the credential module 506 includes code to receive an identifier indicating permissions granted to an application and request authorization to store sensitive data with a service based on authentication credentials. For example, the authentication credentials can be a username and password, a token, and the like. The capture module 508 includes code to capture sensitive data from a sensor on a device. For example, the sensitive data can include an image, an audio stream, or a video. In some examples, the sensitive data can include text received in response to displaying a data entry field. The streaming module 510 includes code to bypass storing the captured sensitive data in any non-volatile memory in the device and stream the captured sensitive data to the service from the sensor. For example, the sensitive data may be stored on one or more servers supporting the selected service. The grouping module 512 includes code to send event information to the service in a file header for grouping the captured sensitive data based on the event information.

In some examples, the quality module 514 includes code to receive a quality setting and modify the quality of the captured sensitive data. In some examples, the sharing module 516 can also include code to send a URL including the location of the sensitive data on the service to the authorized recipients via an email. In some examples, the sharing module 516 can further include code to send the capture sensitive data to the authorized recipients as an encrypted email attachment. For example, the sharing module 516 can send a request to an email service to send the email with the encrypted email attachment. If the sending user is one of the recipients, or if the email service is setup to store all sent emails in a "sent" folder, then the user sharing the sensitive information may also receive a copy of the sensitive information.

It is to be understood that any number of additional software components not shown in FIG. 8 can be included within the tangible, computer-readable storage media 800, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

Example 1

This example provides for an example system for storing sensitive data. The example system includes a processor and a computer-readable memory storage device storing executable instructions that can be executed by the processor to cause the processor to send authentication credentials to a service to request authorization to store sensitive data with the service. The example system can include instructions that can be executed by the processor to cause the processor to capture the sensitive data from a sensor on a device. The example system can also include instructions that can be executed by the processor to cause the processor to bypass storing the captured sensitive data in any non-volatile memory in the device and stream the captured sensitive data to the service from the sensor. Alternatively, or in addition the service can be located on a service, the server being one of a plurality of storage servers and the processor is to send the credentials to any of the plurality of storage servers. Alternatively, or in addition, the processor can further receive an identifier, the identifier comprising permissions granted to an application. Alternatively, or in addition, the example system can include instructions that can be executed by the processor to cause the processor to attach grouping information to the streamed sensitive data, the streamed sensitive data to be grouped based on the grouping information. Alternatively, or in addition, to the example system can include instructions that can be executed by the processor to cause the processor to modify the captured sensitive data to reduce the size of the captured sensitive data. Alternatively, or in addition, the sensitive data can include an image, an audio stream, or a video. Alternatively, or in addition, the sensitive data can include text received in response to displaying a data entry field.

Example 2

This example provides for an example method for storing sensitive data. The example method can include sending, via a processor, authentication credentials to a service to request authorization to store sensitive data with the service. The example method can also include capturing, via the processor, the sensitive data from a sensor on a device. The example method can further include bypassing, via the processor, storing the captured sensitive data in any non-volatile memory in the device. The example method can also further include streaming, via the processor, the captured sensitive data to the service from the sensor. The example method can also include sending, via the processor, event information to the service in a file header for grouping the captured sensitive data based on the event information. Alternatively, or in addition, the example method may include receiving, via the processor, an identifier, the identifier comprising permissions granted to an application. Alternatively, or in addition, the example method may include sending event information in a file header for grouping the captured sensitive databased on the event information. Alternatively, or in addition, the example method may include receiving a quality setting and adjusting a resolution of data capture. Alternatively, or in addition, the example method may include retrieving the sensitive data from the service based on a uniform resource locator. Alternatively, or in addition, the captured sensitive data comprises an image, an audio stream, or a video. Alternatively, or in addition, the captured sensitive data comprises text received in response to displaying a data entry field.

Example 3

This example provides for one or more computer-readable storage devices for storing computer readable instructions that, when executed by one or more processing devices, instruct the storage of sensitive data. The computer-readable medium includes instructions to receive an identifier comprising permissions granted to an application and request authorization to store sensitive data with a service based on the authentication credentials. The computer-readable medium also includes instructions to capture sensitive data from a sensor on a device. The computer-readable medium includes instructions to bypass storing the captured sensitive data in any non-volatile memory in the device. Further, the computer-readable medium includes instructions to stream the captured sensitive data to the service from the sensor. The computer-readable medium also further includes instructions to send event information to the service in a file header for grouping the captured sensitive data based on the event information. Alternatively, or in addition, the computer-readable medium may include instructions to receive a quality setting and modify the quality of the captured sensitive data. Alternatively, or in addition, the computer-readable medium may include instructions to send a uniform resource locator comprising the location of the sensitive data on the service to the authorized recipients via an email. Alternatively, or in addition, the computer-readable medium may include instructions to send the capture sensitive data to the authorized recipients as an encrypted email attachment. Alternatively, or in addition, the sensitive data comprises an image, an audio stream, or a video. Alternatively, or in addition, the captured sensitive data comprises text received in response to displaying a data entry field.

Example 4

This example provides for an example system for storing sensitive data. The example system includes means for sending authentication credentials to a service to request authorization to store sensitive data with the service. The example system can include means for capturing the sensitive data from a sensor on a device. The example system can also include means for bypassing the storage of the captured sensitive data in any non-volatile memory in the device and stream the captured sensitive data to the service from the sensor. Alternatively, or in addition the service can be located on a server, the service being one of a plurality of storage servers and can include means for sending the credentials to any of the plurality of storage servers. Alternatively, or in addition, the example system can include means for receiving an identifier, the identifier comprising permissions granted to an application. Alternatively, or in addition, the example system can include means for attaching grouping information to the streamed sensitive data, the streamed sensitive data to be grouped based on the grouping information. Alternatively, or in addition, the example system can include means for modifying the captured sensitive data to reduce the size of the captured sensitive data. Alternatively, or in addition, the sensitive data can include an image, an audio stream, or a video. Alternatively, or in addition, the sensitive data can include text received in response to displaying a data entry field.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for storing sensitive data, comprising:
a processor; and
a computer-readable memory storage device storing executable instructions that, in response to being executed by the processor, are to cause the processor to:
send authentication credentials to a service to request authorization to store sensitive data with the service, wherein the service is located on a server, the server being one of a plurality of storage servers, and wherein the processor is to send the credentials to any of the plurality of storage servers;
receive an identifier, the identifier comprising permissions granted to an application;
capture the sensitive data from a sensor on a device and attach grouping information to the streamed sensitive data, the streamed sensitive data to be grouped based on the grouping information;
group the sensitive data based on an event or a meeting corresponding to a time that the sensitive data is captured; and
bypass storing the grouped sensitive data in any non-volatile memory in the device and stream the grouped sensitive data to the service from the sensor, the grouped sensitive data to be shared with one or more participants of the event or the meeting.

2. The system of claim 1, further comprising instructions that can be executed by the processor to cause the processor to modify the captured sensitive data to reduce the size of the captured sensitive data.

3. The system of claim 1, wherein the sensitive data comprises an image, an audio stream, or a video.

4. The system of claim 1, the sensitive data comprising text received in response to displaying a data entry field.

5. A method for storing sensitive data, comprising:
sending, via a processor, authentication credentials to a service to request authorization to store sensitive data with the service, wherein the service is located on a server, the server being one of a plurality of storage servers, and wherein the processor is to send the credentials to any of the plurality of storage servers;
receiving, via the processor, an identifier, the identifier comprising permissions granted to an application;
capturing, via the processor, the sensitive data from a sensor on a device;
bypassing, via the processor, storing the captured sensitive data in any non-volatile memory in the device;
streaming, via the processor, the captured sensitive data to the service from the sensor; and
sending, via the processor, event information comprising a time, a date, a place, and a plurality of attendees, of a meeting during which the captured sensitive data was captured to the service in a file header of the streamed sensitive data for grouping the captured sensitive data based on the event information, the grouped sensitive data to be shared with one or more of the attendees of the meeting.

6. The method of claim 5, further comprising receiving a quality setting and adjusting a resolution of data capture.

7. The method of claim 5, further comprising retrieving the sensitive data from the service based on a uniform resource locator.

8. The method of claim 7, wherein the captured sensitive data comprises an image, an audio stream, or a video.

9. The method of claim 5, wherein the captured sensitive data comprises text received in response to displaying a data entry field.

10. One or more computer-readable storage devices for storing sensitive data, comprising a plurality of instructions that, in response to being executed by a processor, cause the processor to:
receive an identifier comprising permissions granted to an application and request authorization to store sensitive data with a service based on authentication credentials, wherein the service is located on a server, the server being one of a plurality of storage servers, and wherein the processor is to send the credentials to any of the plurality of storage servers;
receive an identifier, the identifier comprising permissions granted to an application;
capture the sensitive data from a sensor;
bypass storing the captured sensitive data in any non-volatile memory in the device;
attach grouping information to the captured sensitive data and stream the captured sensitive data to the service from the sensor, the streamed sensitive data to be grouped based on the grouping information; and
send event information comprising time, date, place, and a plurality of attendees, of a meeting during which the captured sensitive data was captured to the service in a file header for grouping the captured sensitive data based on the event information, the grouped sensitive data to be shared with one or more of the attendees of the meeting.

11. The one or more computer-readable storage device of claim 10, further comprising instructions to receive a quality setting and modify the quality of the captured sensitive data.

12. The one or more computer-readable storage device of claim 10, further comprising instructions to send a uniform resource locator comprising the location of the sensitive data on the service to the authorized recipients via an email.

13. The one or more computer-readable storage device of claim 12, further comprising instructions to send the capture sensitive data to the authorized recipients as an encrypted email attachment.

14. The one or more computer-readable storage device of claim 10, wherein the sensitive data comprises an image, an audio stream, or a video.

15. The one or more computer-readable storage device of claim 10, wherein the captured sensitive data comprises text received in response to displaying a data entry field.

* * * * *